United States Patent [19]
Toda et al.

[11] Patent Number: 5,614,656
[45] Date of Patent: Mar. 25, 1997

[54] COLLIDING G SIMULATION APPARATUS

[75] Inventors: Katsuaki Toda, Komaki; Tadahiro Ohtsuka; Osamu Watanabe, both of Nagoya, all of Japan

[73] Assignee: Mitsubishi Jukogyo Kabushiki Kaisha, Tokyo, Japan

[21] Appl. No.: 551,513

[22] Filed: Nov. 1, 1995

[30] Foreign Application Priority Data

Nov. 14, 1994 [JP] Japan .................................. 6-304309
Dec. 27, 1994 [JP] Japan .................................. 6-326222

[51] Int. Cl.$^6$ .................................................. G01M 7/00
[52] U.S. Cl. ........................................ 73/12.01; 73/865.6
[58] Field of Search ............................. 73/12.01, 12.08, 73/12.09, 865.6, 865.3

[56] References Cited

U.S. PATENT DOCUMENTS 5,483,845  1/1996  Stein et al. ............................. 73/12.01

*Primary Examiner*—Robert Raevis
*Attorney, Agent, or Firm*—Wenderoth, Lind & Ponack

[57] ABSTRACT

A separation device for a colliding G simulation apparatus for vehicles etc. including a hydraulic separation device provided between an output shaft of an actuator and a mock vehicle, an accumulator as a hydraulic pressure source for operating the separation device, a control unit of the separation device, a servo valve and a control unit for controlling the actuator, and a system control unit for dispatching a control signal to the control unit of the actuator. The separation device includes a nut separation actuator, a separation nut, separation signal wiring, a bolt, an electromagnetic valve and a piston. The separation nut is separated and a connection to the bolt is released by a force acting on the piston.

6 Claims, 13 Drawing Sheets

$$\begin{cases} FM = FO - FN \\ FMV = FM2\cos\theta = FM\sin\theta \cdot \cos\theta \\ FMH = FM2\sin\theta = FM\sin^2\theta \end{cases}$$

COLLIDING G SIMULATION APPARATUS

BACKGROUND OF THE INVENTION

1. Field of the Invention

The present invention relates to a separation device for use in a connection portion between an actuator for a vehicle colliding gravity force simulator and a mock vehicle. Hereinafter, the gravity force is referred to as "G".

2. Description of the Prior Art

A conventional vehicle colliding G simulator is constructed as shown in FIG. 16, that is; an actuator 121 is provided to react on a reaction force wall 120 fixedly installed on a floor, and a pressure portion 123 of a mock vehicle 122 is positioned so as to oppose an output shaft 121a of the actuator.

A model of a human body 124 is located on a seat of the mock vehicle and an air source 125 is connected to the actuator 121 via an opening and closing valve 126 and pneumatic piping 127.

When a simulation is performed by use of such construction, air pressure from air source 125 is supplied to the actuator 12 by opening valve 126. The air is supplied via the pneumatic piping 127 and the actuator output shaft 121a collides with the pressure portion 123 of the mock vehicle. The reaction force is absorbed by the reaction force wall 120.

Further, a conventional powder type separation device is used in an engaging type coupling for a vehicle colliding acceleration simulator, as shown in FIG. 17(A) and in FIG. 17(B). The powder type separation nut device 01 is engaged with the front end portion of a bolt 06 passing through a hole 04 provided along the axis of a connected element 02 and a connected element 03 via a pair of front and rear washers 05.

The powder type separation nut device 01 is fitted to the bolt 06 by a pin 07 and is composed of a split type nut 09 fixed to an actuator body 08, powder 010 contained within the actuator body 08, and wiring 011 connected to the outside.

In the powder type separation nut device 01, upon the electricity being connected to the wiring 011, the powder 010 explodes and the actuator body 08 scatters to the front, releasing the split type nut 09. Thus the nut loses its locking function and the connected elements 02, 03 separate from each other at a high velocity.

In the conventional vehicle colliding G simulator shown in FIG. 16, as the actuator output shaft 121a and the mock vehicle 122 separate from each other and the actuator output shaft 121a collides with the pressure portion of the mock vehicle 122, a simulation of the basic G waves will be at the maximum limit.

Further, in an arrangement where an actuator output shaft 121a and a mock vehicle 122 are connected, it may be possible to use a hydraulic servovalve so that a target G can be obtained. However, the stroke of actuator becomes longer and results in reduced responsiveness, and therefore a target G cannot be obtained.

Disadvantages associated with the device shown in FIG. 17, are as follows:

(1) The device is subject to strict controls and regulations due to the use of the powder, and therefore an authorized worker and a powder storage place satisfying the regulations are required, and there are many restrictions in practical use.

(2) The device is necessarily very expensive because it has to be highly reliable and yet still be disposable.

(3) The device explodes and the actuator body 08 scatters, therefore there are problems regarding the safety of workers and the preservation of the device.

SUMMARY OF THE INVENTION

In view of the disadvantages associated with the prior art, it is an object of the present invention to provide a colliding G simulator separation device which does not fall within the regulations of a control act etc. and is capable of repeated uses and does not have scattering component parts, and is excellent in practical use, economy, safety and preserveability.

One feature of the present invention is that a colliding G simulator separation device, used in a colliding G simulator having a hydraulic actuator and a mock vehicle, includes a hydraulic separation coupling device for connecting a hydraulic actuator side and a mock vehicle side and for separating the sides based on a separation control signal. The device also has a hydraulic pressure source for the hydraulic actuator and the hydraulic separation coupling device. Also, a hydraulic circuit is provided for generating a target acceleration at the hydraulic actuator based on an acceleration control signal when the hydraulic actuator side and the mock vehicle side are connected.

With reference to FIG. 5, functions of the present invention are described, in a colliding G test, where the time point of the actuator start is set as the base time zero.

During the time to come to $\Delta t_1$, actuation to a target G is performed by a servosystem A5 for a mock vehicle A15 ($\Delta t_1$ is about 0.1 second).

After the point of $\Delta t_1$, no actuation by the servosystem A5 is needed and the connection of an actuator output shaft A8 and the mock vehicle A15 is separated at this point.

A separation instruction signal is dispatched at the time point $\Delta t_F$ which is obtained by:

$$\Delta t_F = t_1 - (\Delta 1 + \Delta 2)$$

where:

$\Delta 1$=Work time from a processor A1-10 in a control device A1 to a nut separation control device A3, $\Delta 2$=Work time from an electromagnetic valve A4-7 and a nut separation actuator A4-2 to a separation nut A4-3.

Based on this, the nut separation control device A3 works, a separation nut A4-3 which is locking a bolt A4-5 separates and the connection by the bolt A4-5 is thus released. The actuator output shaft A8 stops at its stroke end and the mock vehicle A15 moves by an inertia force.

With reference to FIG. 7, by supplying oil pressure through an oil supply passage B2-4 provided in an actuator unit B2-1, a piston B2-2 moves in the direction of X the axis. The actuator unit B2-2 is fixed.

The piston B2-2 is connected to a connection shaft B7 via a connection element B9 and the connection shaft B7 is fixed to a nut holding element B1-3.

The nut holding element B1-3 is thereby drawn out of a separation nut B2-1. The separation nut B2-1, losing restraint, scatters and a bolt B3 connecting both connected elements B4-1, B4-2 loses its function, and the connection is released.

With reference to FIG. 8 and FIG. 11, a function of the present invention is described in accordance with an example of vehicle colliding G tests:

If a separation coupling C3 does not work in time or does not work at all, the velocity is to be reduced by a damper or the like provided at a vibration generator C1 in order to prevent a vibration generator C2-1 from colliding while it has a vibrated portion C2 connected at the stroke end.

At this time, in order to set up a velocity reduction stroke to obtain such G as not to damage each component of the vibrated portion C2 which weighs about 1 ton and is moving at a velocity of 16 m/sec, assuming that an equal acceleration velocity reduction is realized to a velocity 0 (zero) with a length of 5 cm (assuming a velocity reduction stroke of the vibration generator), an acceleration of about 260G works during 6 m/sec.

Also, an acceleration of 260G acts on a weight C5-1 of an inertia force type actuator C5. If the weight C5-1 is 26 kg, a drawing force of 5200 kg arises at a nut holding element C6-3.

Supposing that the force required for drawing out the nut holding element C6-3 is 1000 kg, the weight C5-1 is to move in the direction of drawing at an acceleration of:

$$a=(5200-1000)/20 \ G=210 \ G$$

Assuming that the nut holding element C6-3 loses its function when it is drawn out by a half of the length (about 1 cm), a time required for drawing out by 1 cm is:

$$t_2=2/210 \ G, \ t=3\times10^{-13} \ sec=3 \ m/sec<6 \ m/sec$$

And, before the stroke end of the vibration generator C1-1 works, the performance and function of the nut can be released.

BRIEF DESCRIPTION OF THE DRAWINGS

In the accompanying drawings:

FIGS. 14(a)–14(c) are drawings showing a fifth preferred embodiment according to the present invention, wherein FIG. 14(a), is a side view, FIG. 14(b) is a longitudinal sectional view and FIG. 14(c) is a front view;

FIGS. 17(a)–17(b) are drawings showing a prior art powder type separation nut device, wherein FIG. 17(a) is a longitudinal sectional view and FIG. 17(b) is a partial side view.

DESCRIPTION OF THE PREFERRED EMBODIMENTS

Figure 1:
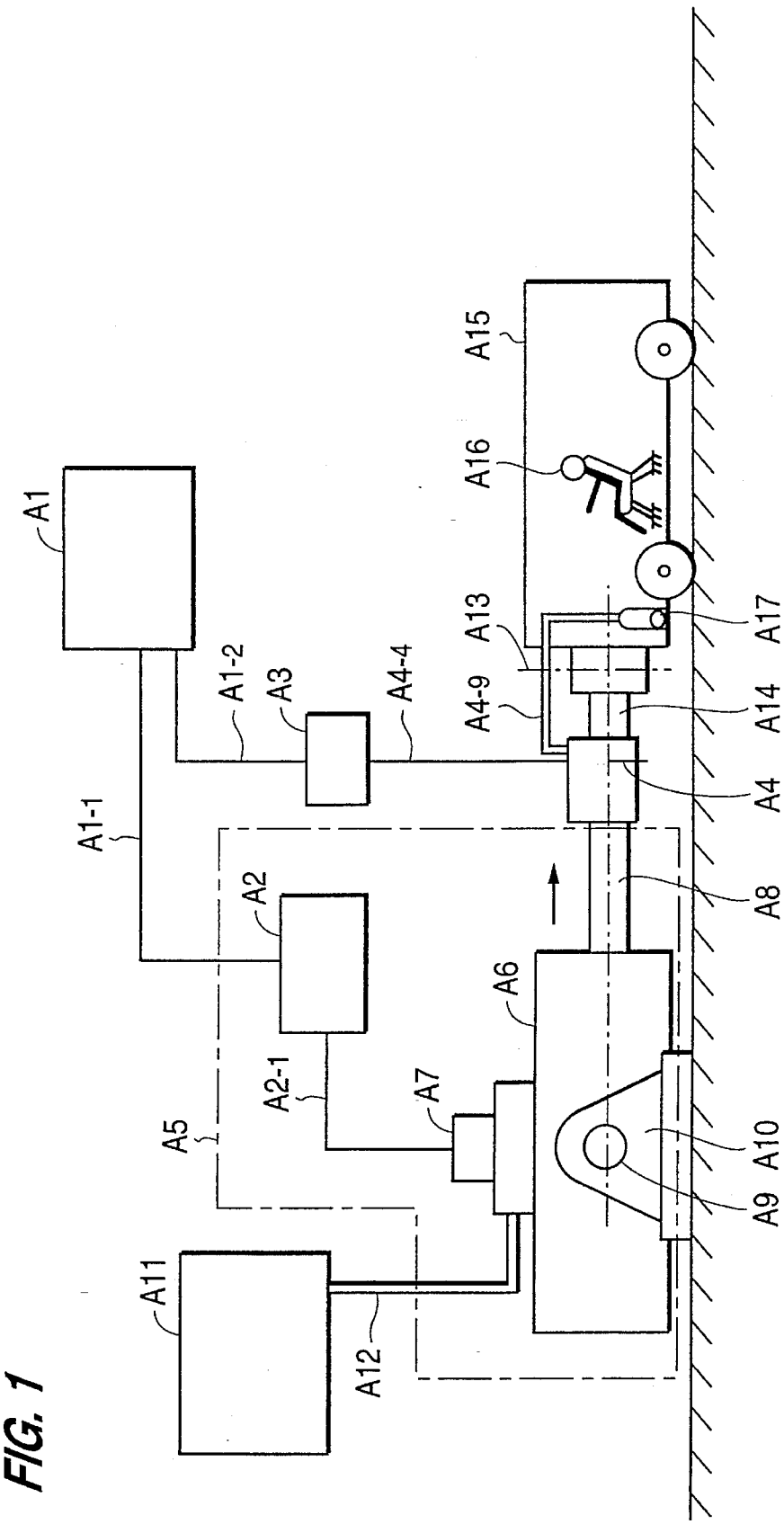
FIG. 1 is a schematic drawing showing a first preferred embodiment according to the present invention.

A first preferred embodiment according to the present invention is shown in FIG. 1 to FIG. 6. FIG. 1 shows an example of an entire apparatus of a vehicle colliding G simulator. The simulator gives a target G shown in FIG. 5 to the mock vehicle A15, and various values arising at a model of a human body A16 are measured.

Figure 5:
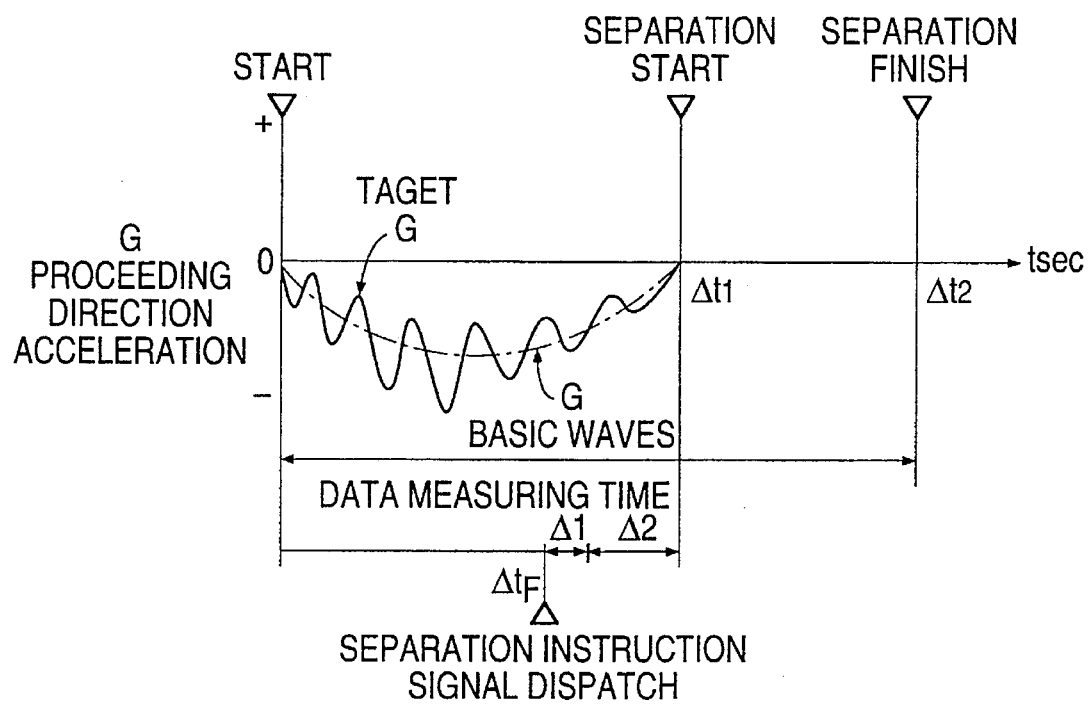
FIG. 5 is an explanatory graph showing the manner of taking measurements associated with the first preferred embodiment.

As shown in FIG. 5, a target G is a G basic wave and a high frequency vibration-like G added thereto until coming to $\Delta t_1$, and thereafter is a state of zero G until coming to $\Delta t_2$ which is the end of the test, during which necessary time data measurements are carried out.

As a means to simulate this state, a mock vehicle A15 and an output shaft A8 of an actuator A6 are connected and actuated by a hydraulic separation coupling A4 and a connecting shaft A14 until coming to $\Delta t_1$, and thereafter the mock vehicle A15 is separated by the hydraulic separation coupling A4.

Thus, the actuator stroke is shortened and prevention of lowered response performance due to compressibility etc. becomes possible.

Firstly, the following describes an example of a case where one separation nut A4-3 (refer to FIG. 2) is used in a hydraulic separation coupling A4.

If a plurality of separating nuts A4-3 are used, a nut separation actuator A4-2, and an electromagnetic valve A4-7, a separation signal wiring A4-4 and hydraulic pipings A4-8, A4-9 for control of the separation nuts will change in accordance with the number of separation nuts A4-3.

Figure 2:
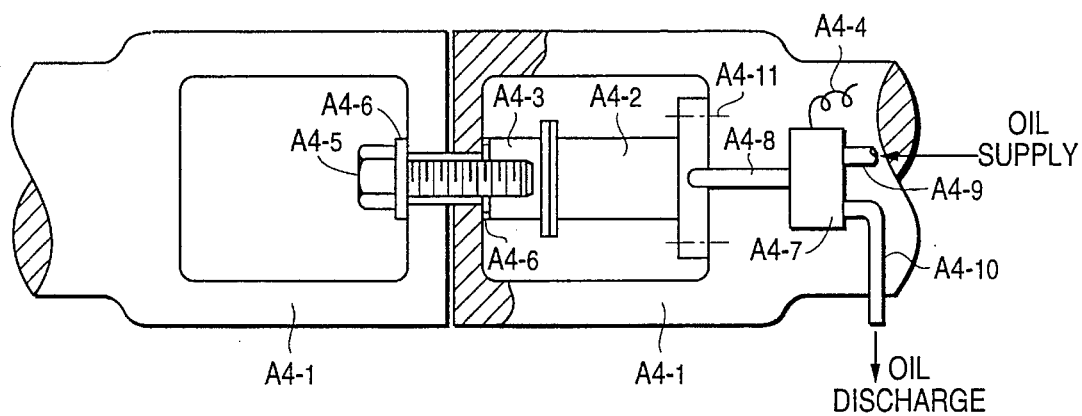
FIG. 2 is a side elevation view of a hydraulic separation coupling of the first preferred embodiment.

As shown in FIG. 2, the separation nut A4-3 together with a bolt A4-5 connects coupling bodies A4-1. The coupling bodies A4-1 have loose or oversize holes so that a small deviation of the center axis of the coupling bodies A4-1, left and right, can be absorbed.

In order not to cause excessive bending stresses or the like at the bolt A4-5, a trunnion shaft A9 is supported by a trunnion bearing A10 having a self-aligning type bearing provided on the actuator side, and a right and left rotating shaft A13 having a self-aligning type bearing is provided on the mock vehicle side. Other types of mechanisms which do not affect the work of the separation nut A4-3 and the nut separation actuator A4-2 can also be used.

Incidentally, the right and left rotating shaft A13 is provided with a stopper to limit the right and left swing of the connecting shaft.

With reference to FIG. 1, the colliding G simulation test is described.

Upon the simulator (FIG. 1), being given a test start signal at a system control unit A1 (for example, a start switch is turned on), a processor A1-10 (FIG. 6) operates, and at a certain specified timing, a colliding G instruction signal is dispatched from a servomechanism instruction signal A1-11 to a servomechanism A5.

The point of time of the test start is set as 0 (zero) of the time base. The signal from a servomechanism control unit A2 is transmitted through servomechanism instruction signal wiring Al-1, to a servo valve A7 through control wiring A2-1. The control wiring A2-1 includes feedback wiring which is necessary for the servomechanism control.

The servo valve A7 controls the oil supplied from an oil supply unit A11 through a hydraulic piping A12 and realizes the G basic wave shapes as shown in FIG. 5.

Figure 6:
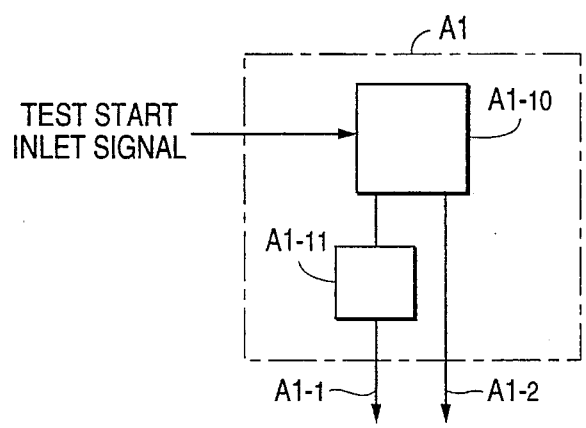
FIG. 6 is a diagram showing main functions of a control device of the first preferred embodiment.

On the other hand, during the work time al shown in FIG. 5 of a nut separation control unit A3, an electromagnetic valve A4-7 works and a nut separation actuator A4-2 works, and where $\Delta t_2$ is a time until the separation nut A4-3 separates, at a time point $\Delta t_F$:

$$\Delta t_F = \Delta t_1 - (\Delta 1 + \Delta 2)$$

from the time basis 0 (zero), the processor Al-10 shown in FIG. 6 dispatches a separation instruction signal to the separation nut A4-3.

The instruction is put in the nut separation control unit A3 through a separation instruction signal wiring A1-2. Based on the instruction, the electromagnetic valve A4-7 works through a separation instruction signal wiring A4-4.

Figure 4:
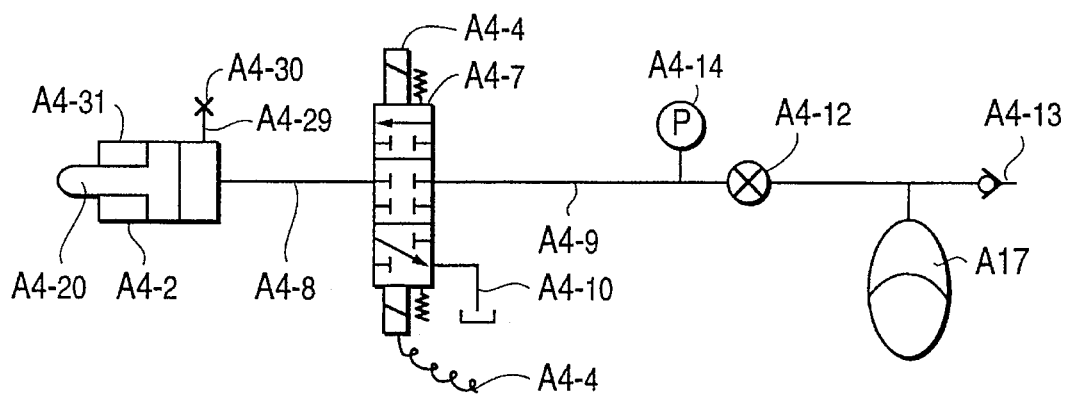
FIG. 4 is a diagrammatic view of a hydraulic system of the first preferred embodiment.

FIG. 4 shows a diagrammatic view of a hydraulic system of the separation coupling.

The oil stored under pressure in an accumulator A17 is supplied to the electromagnetic valve A4-7 through an oil supply piping A4-9 and is supplied to the nut separation actuator A4-2 through an oil pressure piping A4-8.

A stop valve A4-12, shown in FIG. 4, is used for depressurization when the oil supply from the accumulator is stopped or the air in the hydraulic system of the separation actuator A4-2 is taken out. The air collected in the nut separation actuator A4-2 is discharged to the outside together with the oil through an air escape passage A4-29, and after the air escape is finished, a blind cover A4-30 is fitted for closing.

A pressure gauge A4-14 shows a residual oil pressure of the accumulator A17. A check valve A4-13 is used for oil supply to the accumulator A17. Upon a separation signal being given to the electromagnetic valve A4-7 through the separation signal wiring A4-4, the electromagnetic valve A4-7 shown in FIG. 4 is switched from a neutral position to an oil pressure supply position (downwardly) and a high pressure oil of the accumulator A17 is supplied to the nut separation actuator A4-2.

Figure 3:
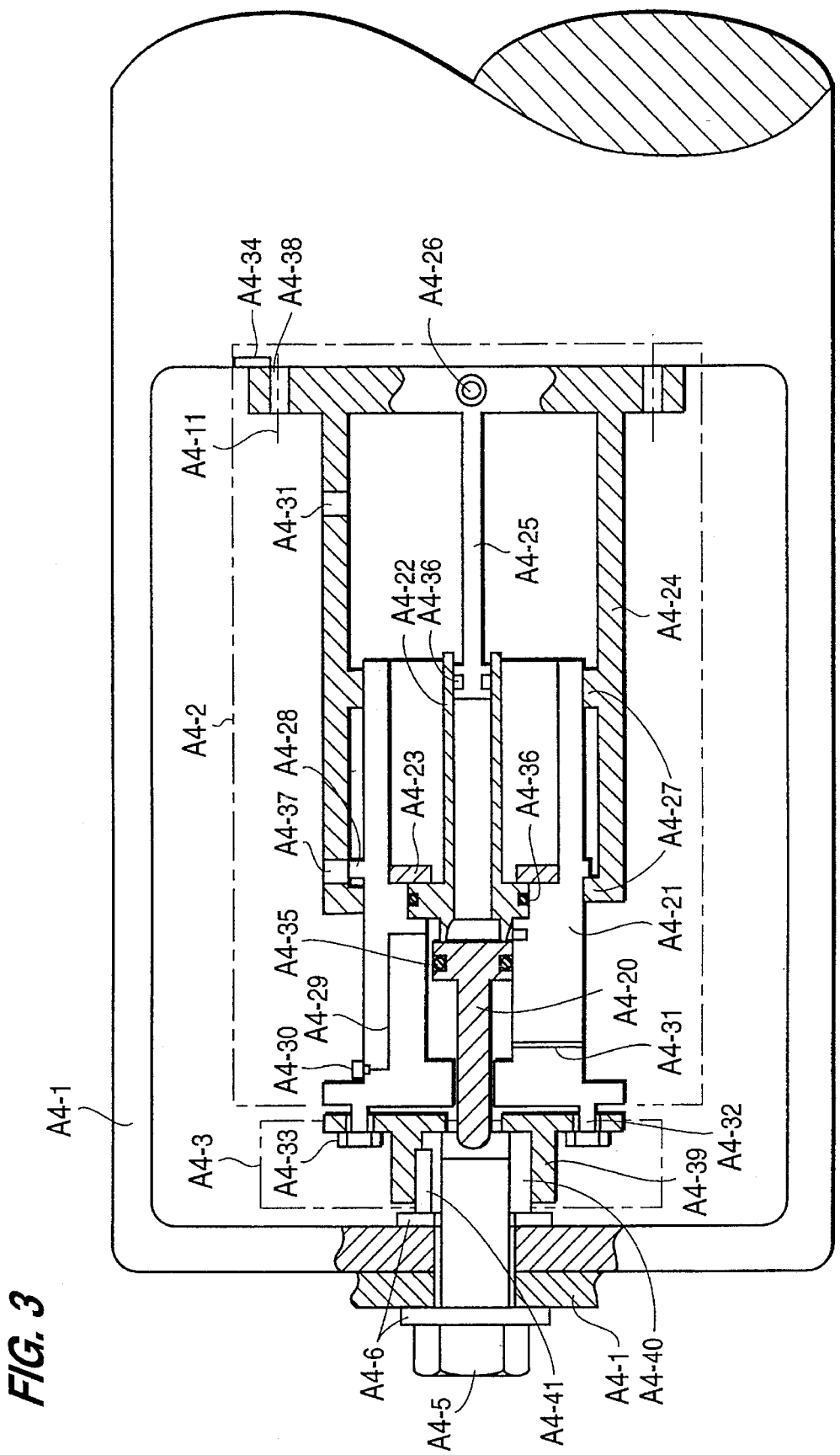
FIG. 3 is a partial cross-sectional view of the separation coupling unit of the first preferred embodiment as shown in FIG. 1.

Next, referring to FIG. 3, actions of the nut separation actuator A4-2 and the separation nut A4-3 are described.

The separation nut A4-3 is firmly fixed to stud bolts A4-32 of a body A4-21 of the actuator A4-2 by nuts and washers A4-33. At this time, a body supporting portion A4-24 is fitted to a coupling body A4-1 slightly movably by a bolt A4-11 via a loose hole A4-38. The coupling body A4-1 is connected by the separation nut A4-3 to which a bolt A4-5, a washer A4-6 and the body A4-21 are connected.

In a state where an undue force is not acting on the body A4-21, the bolt A4-11 is locked and the body supporting portion A4-24 is fixed to the coupling body A4-1. At this time, if an interstice occurs due to an incline between the connecting faces of the body supporting portion A4-24 and the coupling body A4-1, a firm connection is obtained by the use of a shim A4-34.

The oil supplied from the electromagnetic valve A4-7 to the nut separation actuator A4-2 is sent to an oil supply inlet A4-26 through the piping A4-8 and then enters into the body A4-21 through an oil supply passage A4-25 and applies pressure to a piston A4-20. The piston A4-20 is pushed slightly by the oil pressure and pushes the bolt A4-5. As the bolt A4-5 is firmly fixed by the separation nut A4-3 and is thereby fixed to the body A4-21 by a fixing element A4-23, a force acts on the actuator end A4-22, which is fixed to the body A4-21 via the fixing element A4-23, to move the body A4-21 to the right direction. The body A4-21 is led to a sliding portion A4-27 of the body supporting portion A4-24 and moves in a direction to draw out the separation nut A4-3. The sliding portion A4-27 is provided with a bearing for lubrication so that the body A4-21 can move with less friction, and the bearing serves to guide movement of the body A4-21 along an axial direction. The actuator end (cylinder end) A4-22 is constructed so as to have an oil passage in the central portion as shown in FIG. 3 for connecting with the oil supply passage A4-25 of the body supporting portion A4-24, and also functions to adjust the length of the oil passage corresponding to the movement of the body A4-21.

The contact portion of the piston A4-20 is constructed so that the contact area is small and oil grooves are provided thereon for easy separation. The piston A4-20 is provided with a cap seal A4-35 etc. for less friction and for guiding the piston. The actuator end (cylinder end) portion is also designed to reduce the friction.

The body A4-21 is provided with an air escape hole A4-31 so that the air in a chamber on the output shaft side of the piston A4-20 can escape when the body A4-21 moves in a direction to the right. Likewise, the body supporting portion A4-24 is provided with an air escape hole A4-31 so that the air in the body supporting portion can escape when the body A4-24 moves in a direction to the right.

The body A4-21 is designed not to get out from the body supporting portion A4-24 by a stopper A4-28 fitted through a stopper fixing hole A4-37.

In order to avoid oil leakage, the actuator end (cylinder end) A4-22 and the oil supply passage A4-20 are provided with seals A4-36.

In the separation nut A4-3, a slit type nut A4-40 is incorporated within a split nut cover A4-39. A pin A4-41 is provided so that when a torque acts on the nut there will be no sliding between the nut and the nut cover. The split nut cover A4-39 has a flange and is fixed to the body A4-21 by use of a loose hole.

The split nut cover A4-39 is designed to get out when it is pulled in an axial direction, and if it gets out, the split type nut A4-40 scatters and loses its function as a nut.

After tests are finished, the electromagnetic valve A4-7 is switched so as to drop the oil pressure within the nut separation actuator A4-2 to atmospheric pressure via an oil discharge piping A4-10. The nut A4-33 coupling the separation nut A4-3 to the body A4-21 is loosened and removed.

As the body A4-21 is movable in an axial direction and rotatable about the axis, the separation nut A4-3 can be moved to a place where work can be easily performed. At this time, the stop valve A4-12 is closed.

When a subsequent test is carried out, a new separation nut A4-3 locks the bolt A4-5 to connect the body A4-21. At this time, the piston A4-20 is retracted to the actuator end A4-22. The electromagnetic valve A4-7 is switched so that the oil is supplied to the separation actuator A4-2. The blind cover A4-30 for air escape is taken off, the stop valve A4-12 is gradually opened, and air is taken out and the blind cover A4-30 is replaced.

The electromagnetic valve A4-7 is switched to a neutral position (a state of FIG. 4) and the stop valve A4-12 is fully opened, then the nut separation actuator A4-2 and the separation nut A4-3 are ready for a test.

Figure 7:
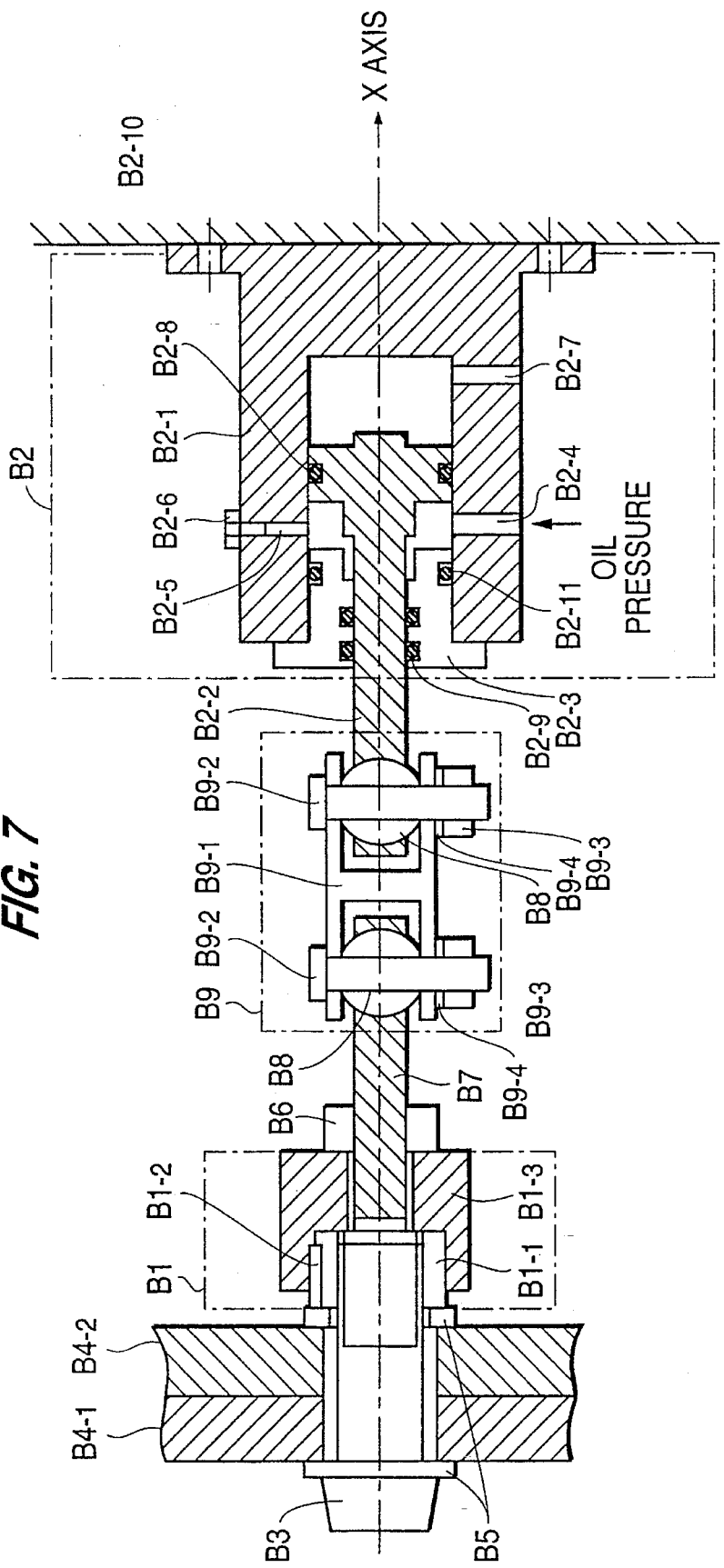
FIG. 7 is a side view in cross section showing a second preferred embodiment according to the present invention.

A second preferred embodiment according to the present invention is shown in FIG. 7. FIG. 7 shows an example of elements B4-1, B4-2 being connected by the use of a piston connection type hydraulic split nut. The piston connection type hydraulic split nut is composed of a separation nut B1, an actuator B2, a shaft B7 and a connection element B9.

The separation nut B1 is composed of a split type nut B1-1, a pin B1-2 and a nut holding element B1-3. The nut holding element B1-3 is a holding element by which the split type nut B1-1, split into four portions for example, attains its function and performance as a nut, and the pin B1-2 is provided so that, when the separation nut B1 locks a bolt B3, the split type nut B1-1 and the nut holding element B1-3 do not rotate about the X axis and the nut holding element B1-3 slides along the direction of the X axis so as to get out from the split type nut B1-1.

The actuator B2 includes an actuator body B2-1, a piston B2-2 and an end element B2-3. The actuator body B2-1 is fixed to the outside by use of loose holes B2-10 for bolts as shown in FIG. 7.

The connection element B9 includes an element body B9-1, bolts B9-2, nuts B9-3 and washers B9-4, and connects between the shaft B7 and the piston B2-2.

One end of the shaft B7 is threadedly connected to the nut holding element B1-3 and a loosening stop is applied by a nut B6. At the other end, a self-aligning type bearing B8 is provided. On the other hand, at the end of an output shaft of the piston B2-2 of the actuator B2, a self-aligning type bearing B8 is also provided, and even if a slight deviation from the X axis between the shaft B7 and the piston B2-2 occurs, a firm connection therebetween is assured by the connection element B9. The bolts B9-2 of the connection element B9 are shown in a state that they are used in parallel, but a case of using them with a 90° deviation of phase is also possible.

For assembling a set of the separation nut B1, the connected elements B4-1, B4-2 are connected by the bolt B3 and a washer B5. The shaft B7 is fixed to the separation nut B1 by the nut B6.

On the other hand, the element body B9-1 of the connection element B9 is connected to the piston B2-2 of the actuator B2 by the bolt B9-2 and the nut B9-3. In order to connect the shaft B7 and the element body B9-1 after the set of the separation nut B1 is completed, the element body B9-1 is moved along the direction of the X axis and is rotated about the X axis, and the bolt B9-2 is set in the self-aligning type bearing B8 for connection. By moving the element body B9-1, the piston B2-2 correspondingly moves and rotates, thus the element body B9-1 and the self-aligning type bearing B8 of the shaft B7 become correctly connectable.

To the body B2-1, oil pressure is supplied from an oil pressure supply passage B2-4, a force to move the piston B22 along the direction of the X axis arises, the nut holding element B1-3 is drawn out via the connection element B9 and the shaft B7, and the separation nut B1 connecting the bolt B3 loses its function. An oil chamber within the body B2-1 has an air escape passage B2-5 to remove the stored air and a blind cover B2-6 after the air is removed. Also, an air hole B2-7 is provided so that, when the piston B2-2 moves along the direction of the X axis, the air can easily come in and come out on the side of the oil supply and on the opposite side.

As for sealings of the hydraulic components, a sliding portion cap seal B2-8, a fixed portion seal B2-11 and a dust seal B-9 at the inlet and outlet of the piston B2-2 are provided.

The separation nut B1 can be exchanged by the lock nut B6 being loosened and the nut holding element B1-3 being taken out from the shaft B7, or by the bolt B9-2 connecting the shaft B7 and the element body B9-1 being taken out and the nut holding element B1-3 together with the shaft B7 being taken out.

A third preferred embodiment according to the present invention is shown in FIG. 8 to FIG. 12.

Figure 11:
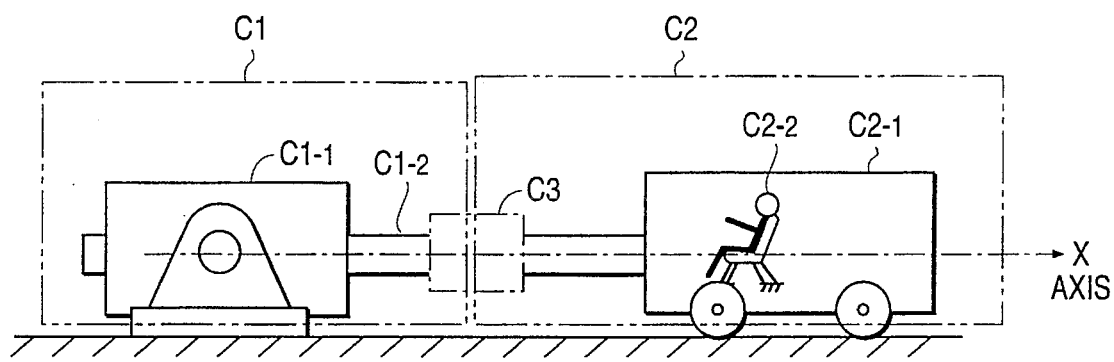
FIG. 11 is a schematic drawing showing a vehicle colliding G simulator of the third preferred embodiment.
Figure 16:
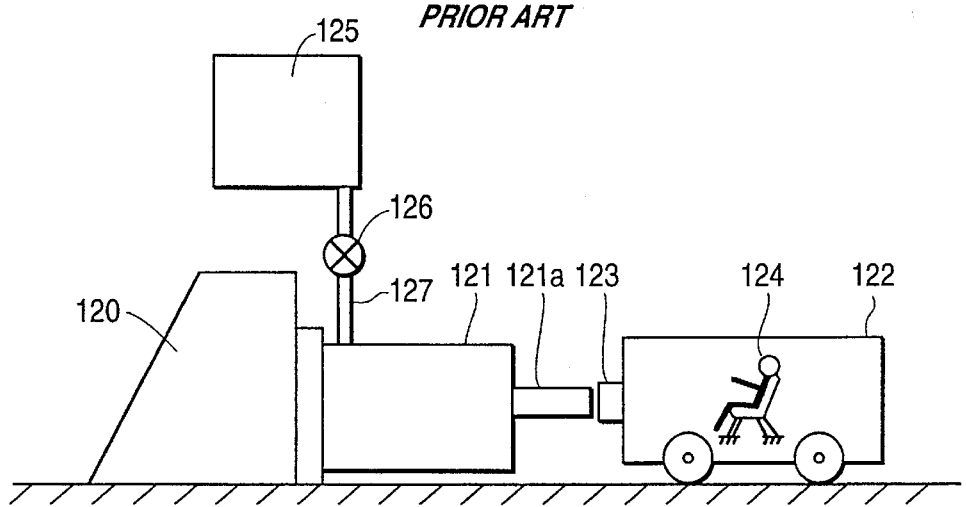
FIG. 16 is a schematic drawing showing a prior art device.

With reference to FIG. 11, the apparatus is so constructed that acceleration at the time of collision with a mock vehicle C2-1 caused by a vibration generator Cl-1 is simulated, and after about 0.1 second, a vibrated element C2 is separated at the separation coupling C3.

At this time, the vibrated portion C2 has a velocity of about 16 m/sec. If a separation is not made, a vibration generator C1-1 will receive the vibrated portion C2 which weighs about 1 ton and moves at this velocity.

Figure 8:
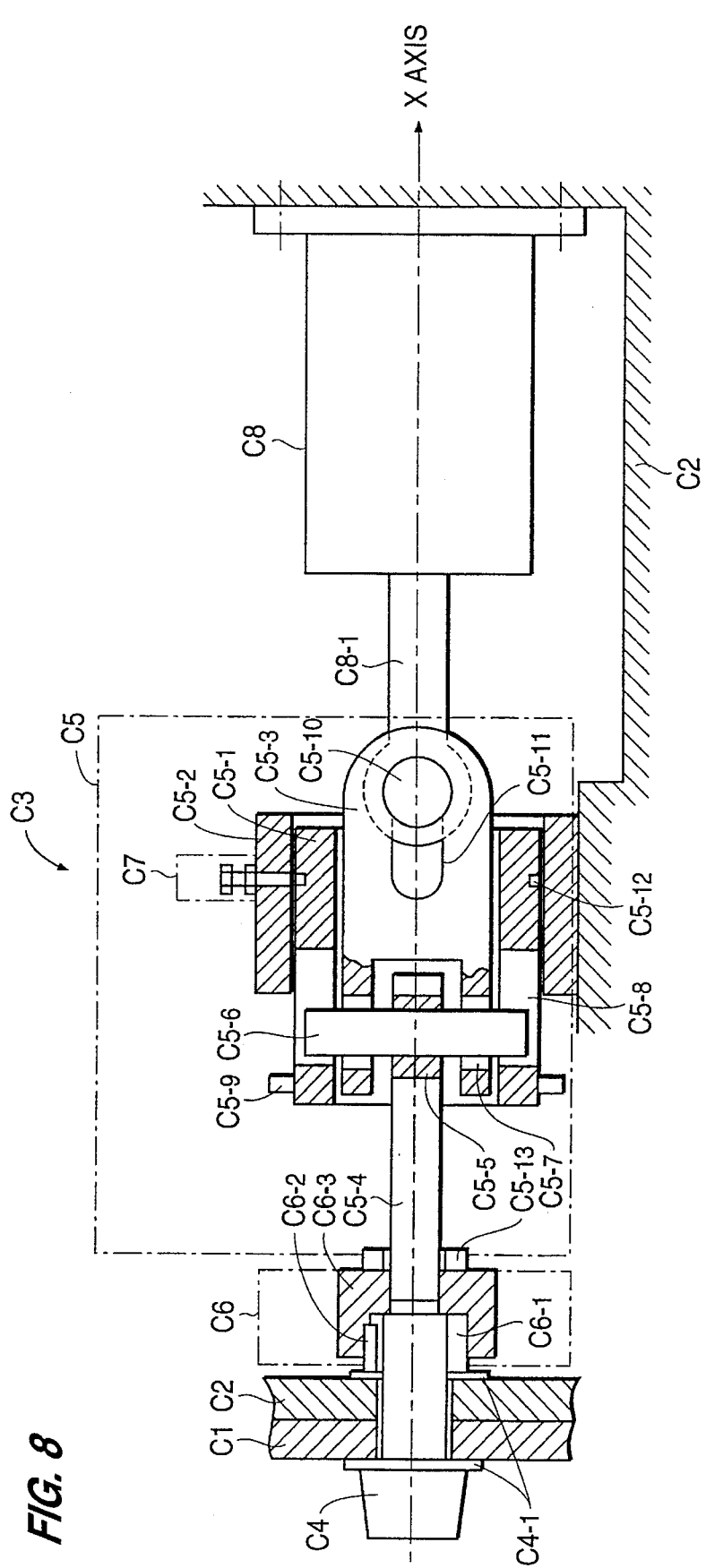
FIG. 8 is a drawing showing a third preferred embodiment according to the present invention.

With reference to FIG. 8, the separation coupling C3 is composed of an inertia force type actuator C5 (for a split type nut) for connection and release of the connection portion which connects connected portions (a vibration portion Cl and the vibrated portion C2) by a bolt C4, a washer C4-1 and a separation nut C6. The inertia force type actuator also is for drawing out a nut holding element C6-3 and an actuator C8 operable in response to an instruction signal.

The inertia force type actuator C5 includes a weight C5-1 which is held by a holding element C5-2 so as to operate when an acceleration acts in the direction of the X axis.

In order to draw out the nut holding element C6-3, a shaft C5-4 is fixed to the nut holding element C6-3 by a nut C5-13. At the other end of the shaft C5-4, a self-aligning type bearing is provided so as to be connected to a connecting element C5-3 by a shaft C5-6 via a bearing C5-7.

Both ends of the shaft C5-6 are constructed so as to be able to transmit a drawing force from the weight C5-1 in the direction of the X axis.

At the other end of the connection element C5-3, an elongated hole C5-11 is provided so that the shaft C5-10 does not obstruct movement of the connection element C5-3 in the direction of the X axis when the nut holding element C6-3 is drawn out by an output shaft C8-1 of the actuator C8 which operates in response to an instruction signal.

The weight C5-1 and the holding element C5-2 include a stopper portion C7 which permits the weight C5-1 to move upon acceleration in a direction of the X axis, but prevents movement of the weight upon an acceleration in the opposite direction. After the weight C5-1 draws out the nut holding element C6-3, a stopper C5-9 hits the holding element C5-2 and stops.

On the other hand, upon an instruction signal, the actuator C8 makes the output shaft C8-1 work and pulls the connection element C5-3 along the direction of the X axis so as to draw out the nut holding element C6-3. At this moment, so that the weight C5-1 may not apply a load to the actuator C8, a stretched hole C5-8 is provided at the weight C5-1 by which the shaft C5-6 can move without obstruction along the direction of the X axis.

The shaft C5-10 is provided so as to cross at a right angle with the shaft C5-6, and is connected to a self-aligning type bearing provided at the output shaft C8-1 of the actuator C8. The holding element C5-2 of the weight C5-1 and the actuator C8 are fixed to the vibrated portion C2.

Figure 9:
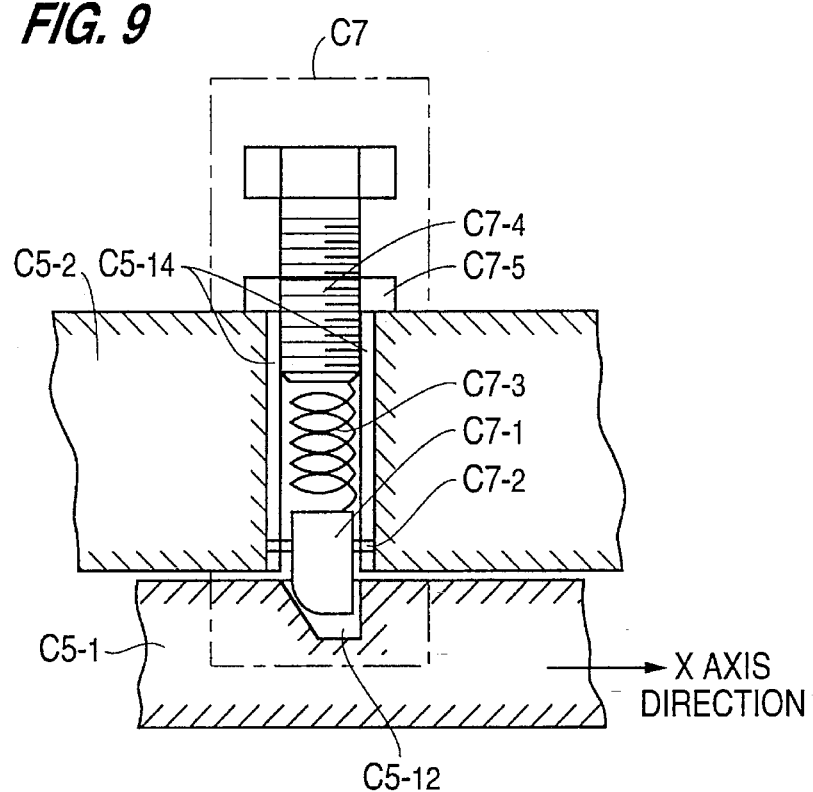
FIG. 9 is an explanatory drawing of a stopper element of a weight holding element of the third preferred embodiment.

If the weight C5-1, as shown in FIG. 9, receives an acceleration in excess of a certain set-up level in the direction of the X axis, a stopper element C7-1 of the stopper portion C7 in contact with an inclined face of a groove C5-12 of the weight C5-1 receives a force so as to be pushed into the holding element C5-2 away from the weight C5-1.

The stopper element C7-1 is constructed so as to be biased with a certain spring force into the groove C5-12 of the weight C5-1 by a spring C7-3 and a bolt C7-4. The bolt C7-4 is fixed to the holding element C5-2 by a loosening stopper C7-5. A guide C7-2 is provided to prevent rotation, but allow up and down movement, of the stopper element C7-1. A guide groove C5-14 is provided at the holding element C5-2.

If an acceleration force acts on the weight C5-1 in the reverse direction of the X axis (to the left in FIG. 9), a pushing-up force does not act on the stopper element C7-1 because the groove C5-1 and the stopper element C7-1 make contact on opposing perpendicular faces in the direction of the X axis.

Figure 10:
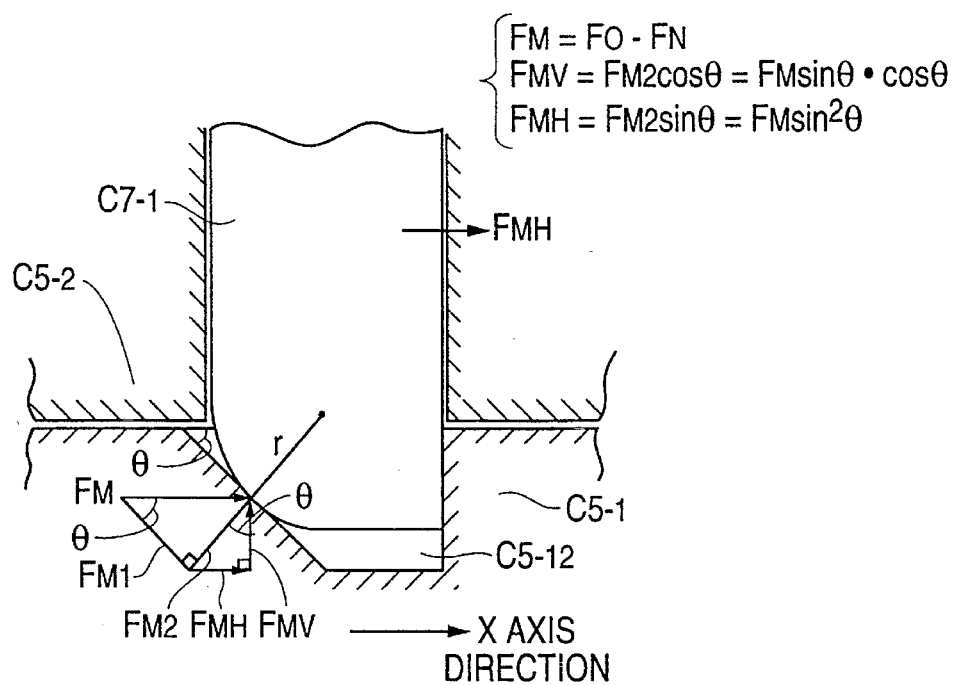
FIG. 10 is an explanatory drawing of forces acting on the stopper element of the third preferred embodiment.

In FIG. 10, where $\theta$ is an angle of the inclined face of the groove C5-12 of the weight C5-1, r is a radius of the portion of the stopper element C7-1 contacting the inclined face. $F_O$ is an accruing force of the weight. $F_N$ is a drawing force of the nut holding element C6-3, and $F_M$ is a force acting on the weight C5-1;

$$F_M = F_O - F_N$$

$$F_{MV} = F_M \sin\theta \cdot \cos\theta$$

$$F_{MH} = F_M \sin^2\theta$$

Where $\mu$ is a friction coefficient between the stopper element C7-1 and the holding element C5-2, and $F_{MV}$ is a pushing-up force of the stopper element C7-1;

$$F_{MV}' = F_{MV} + \mu F_{MH} = F_M(\sin\theta \cdot \cos\theta + \mu\sin^2\theta)$$

On the other hand, supposing that the weight C5-1 moves in the direction of the X axis when the spring C7-3 pressing the stopper element C7-1 is squeezed by a length of r which is a radius of the head portion of the stopper element C7-1, where $F_{MV}$ is a pushing-up force and K is a spring constant ($F_M < F_O$):

$$K_r = F_{MV}$$

$$\therefore K = F_{MV}/r$$

If a rough order is considered the following result is obtained:

Supposing that the vibrated portion C2 makes an equal acceleration velocity reduction from V=16 m/sec to V=0 m/sec in a length of 5 cm (the vibration generator C1 has a velocity reduction mechanism with the above-mentioned feature and the length to the stroke end of the vibration generator is assumed 5 cm) and that an acceleration at this time is:

$$\begin{aligned} a' &= \{1.6 \times 10^3 \text{ (cm/sec)}\}^2/2 \times 5 \text{ cm} \\ &= 2.6 \times 10^5 \text{ cm/sec}^2 \\ &= 260G \end{aligned}$$

then the time required until the stopping is:

$$t = (1.6 \times 10^3)/(2.6 \times 10^5) = 0.006 \text{ sec}$$

If the weight C5-1 weighs 20 kg while an acceleration of 260 G is acting, a force acting on the weight C5-1 to the direction of X axis is:

$$20 \text{ kg} \times 260 \text{ } G = 5200 \text{ kg}$$

If a drawing force $F_N$ of the nut holding element C6-3 is 1000 kg, the acceleration a that this weight receives is:

$$5200 \text{ kg} - 1000 \text{ kg} = (20/G) \cdot a$$

$$\therefore a = (4200/20)G = 210G$$

Supposing that the nut holding element C6-3 loses its function as a nut when it is drawn out by a half of its length at the acceleration, the time t required for drawing out is:

$$t_2 = 2/(210 \text{ } G)$$

$$t = 0.003 \text{ sec} < 0.006 \text{ sec}$$

and a separation is done before the piston of the vibration generator comes to the end of the stroke.

On the other hand, the spring constant K of the spring C7-3 to press the stopper element C7-1 is:

$$K \times 10 \text{ mm} = 10 \text{ kg}$$

$$\therefore K = 1 \text{ kg/mm}$$

where the radius of the head portion of the stopper element C7-1 is 10 mm and the pressing force is 10 kg.

If the effective winding number of the spring is 10 and the wire diameter of the spring is 1 min, the average diameter of the spring becomes roughly 11 mm.

Supposing that the angle of the groove $\theta$ is 45° and the friction coefficient $\mu$ is 0, a force required for pushing up the stopper element C7-1 is:

$$F_M = 10 \text{ kg}/(\sin 45° \cdot \cos 45°) = 20 \text{ kg}$$

which is of an ignorable order as compared with a force acting on the weight which is:

$$F_O - F_N = 4200 \text{ kg}$$

Figure 12A:
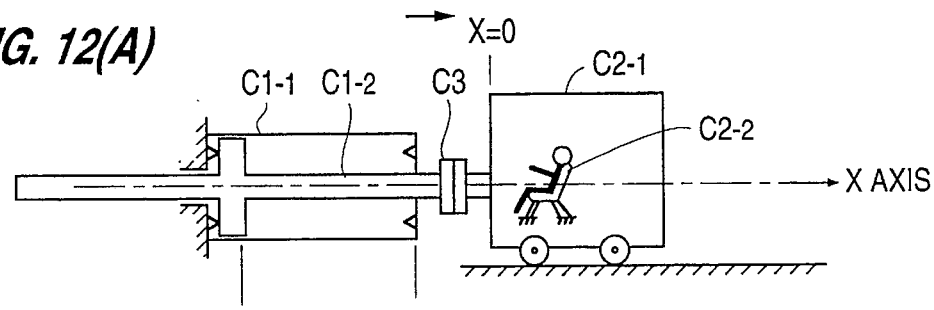
FIGS. 12(a)–12(c) are explanatory drawings of a working state of a separation coupling and corresponding data measurements of the third preferred embodiment.
Figure 12B:
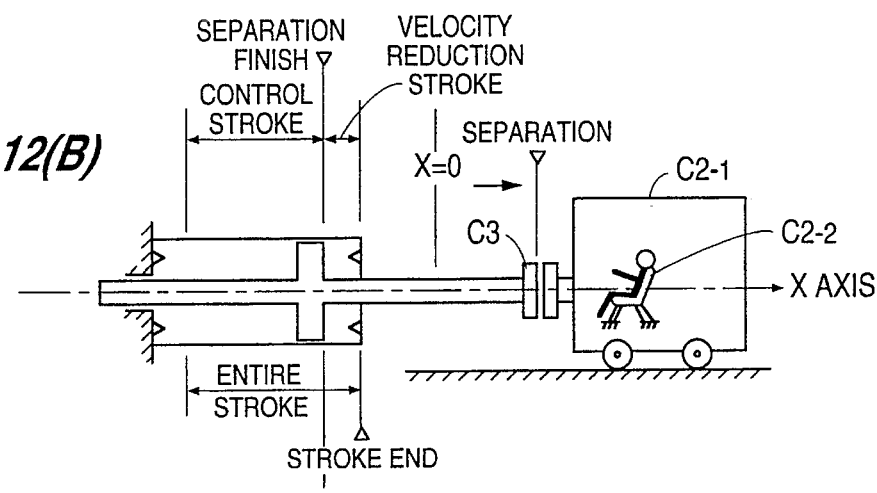
Figure 12C:
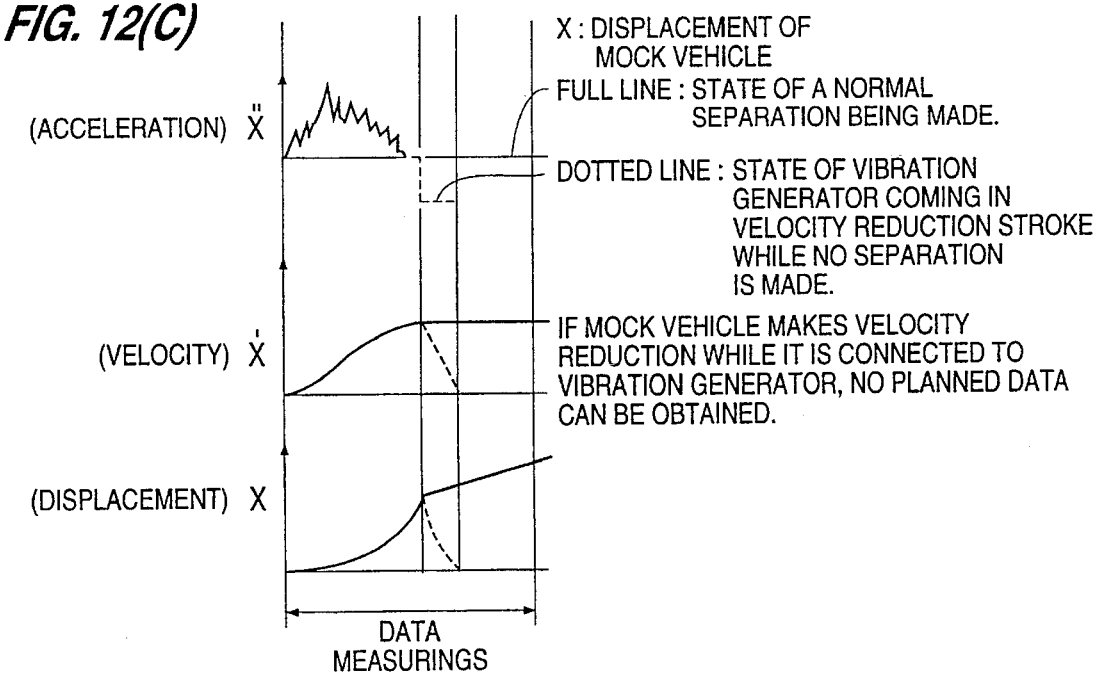

FIG. 12(a) shows a piston of the vibration generator C1-1 at the time the vibration starts. The piston is at the left end and the separation coupling C3 is connected. After the test is finished, the piston is returned to this position and is connected to the vibrated portion C2. FIG. 12(b) shows a state where the vibration generator C1-1 completes vibration within the control stroke and the separation coupling C3 completes a separation. The vibration generator C1-1, having separated the mock vehicle C2-1, comes in a velocity reduction stroke so that the velocity becomes zero at the end of the stroke. This velocity reduction mechanism can work even if the mock vehicle C2-1 is connected. FIG. 12(c) shows various qualitative values of state (acceleration, velocity, displacement) at the time the mock vehicle C2-1 is vibrated, a control stroke of the actuator, a velocity reduction stroke, a state of the separation coupling C3 and relations of data measurings.

Assuming a normal separation, an acceleration X", a velocity X' and a displacement X acting on the mock vehicle C2-1 change as shown by full lines, and a requirement to do data measurings until a certain time elapses after the separation coupling C3 makes separation is well satisfied.

But in a case where the separation coupling C3 does not work correctly, especially where a separation does not occur at all, the vibration generator C1-1, coming in a velocity reduction stroke, starts a velocity reduction.

In a state of equal acceleration velocity reduction, the velocity becomes zero at the stroke end as shown by a dotted line. In this case, planned data cannot be measured.

If a velocity reduction is not correctly obtained while the mock vehicle C2-1 is connected and the piston collides with the stroke end of the vibration generator C1-1, there is a fear that the separation coupling C3 or an expensive model of a human body C2-2 might be damaged.

Figure 13:
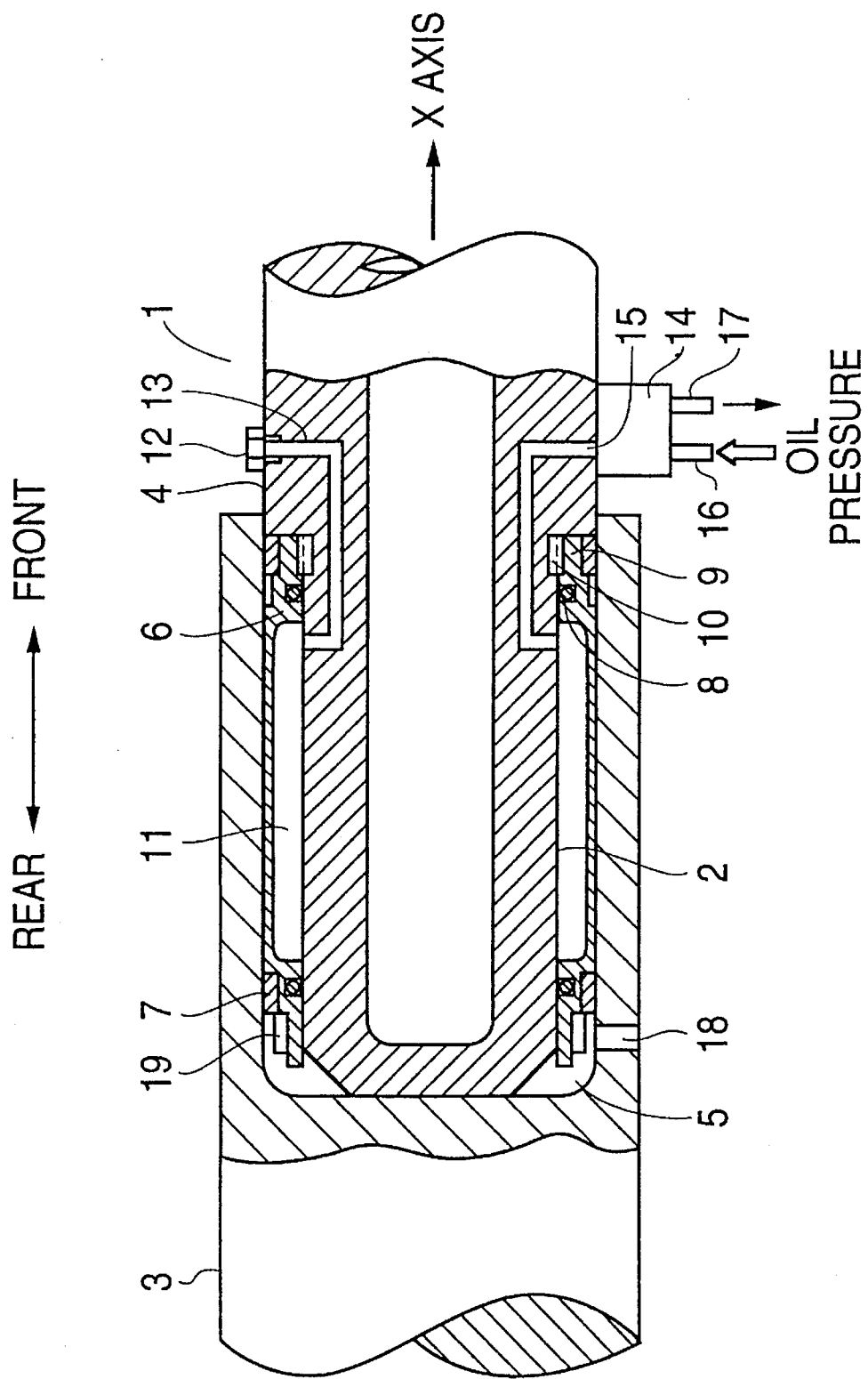
FIG. 13 is a cross sectional view of a fourth preferred embodiment according to the present invention.
Figure 17A:
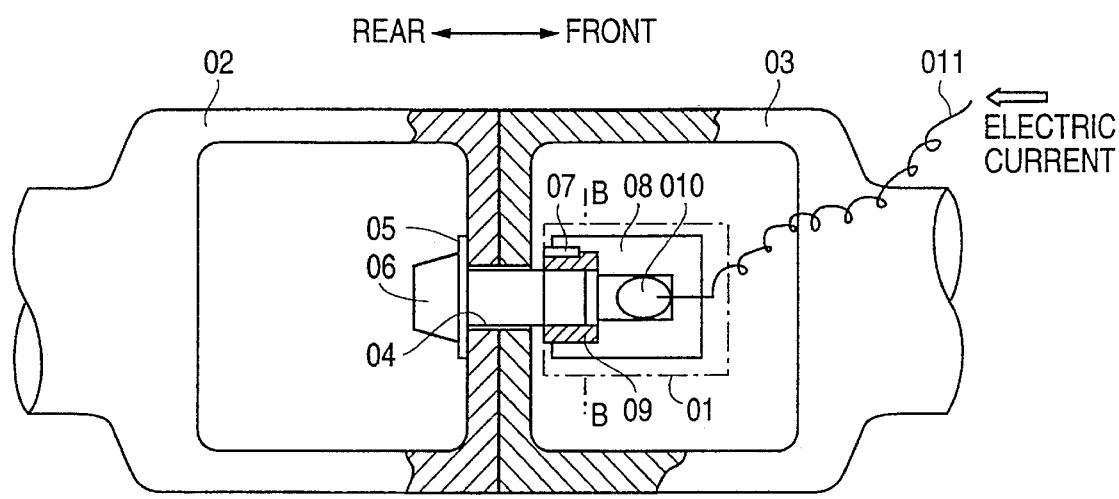
Figure 17B:
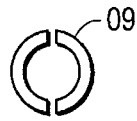

A fourth preferred embodiment according to the present invention is shown in FIG. 13, wherein the same numerals designate the same or like elements and components of FIG. 17. Numeral 1 designates a male coupling body (hereinafter referred to as "male coupling") which is a cylinder shape with a thick fringe, one end of which is closed and at the opposite end portion of which a smaller diameter portion 2 with a step is formed coaxially. Numeral 3 designates a female coupling body (hereinafter referred to as "female coupling") which is a column shape and at the front portion of which a columnar concave hole 5 is formed so that a larger diameter portion 4 of the male coupling 1 is insertable loosely and coaxially.

Numeral 6 designates a cylindrical elastic shell with a thin fringe (hereinafter referred to as "elastic shell") which is insertable coaxially between the smaller diameter portion 2 of the male coupling 1 and the columnar concave hole 5 of the female coupling 3. Numerals 7, 8 designate an annular guide ring and an O-ring, respectively, provided on the outer circumferential surface and on the inner circumferential surface of the front end portion and the rear end portion of the elastic shell 6.

Numerals 9, 10 designate a female thread portion and a male thread portion, respectively, provided on the inner circumferential surface of the elastic shell 6 and on the outer circumferential surface of the front end portion of the smaller diameter portion 2 with a step of the male coupling 1. Numeral 11 designates a cylindrical oil pressure chamber provided between the smaller diameter portion 2 with a step of the male coupling 1 and the elastic shell 6.

Numeral 12 designates a blind cover threadedly fitted on the outer end portion of an air escape hole 13 which connects the rear end portion of the larger diameter portion 4 of the male coupling 1 and the oil pressure chamber 11. Numeral 14 designates an exchange valve having an oil supply inlet 16 and an oil discharge outlet 17 fitted to the outer end portion of an oil hole 15 connecting the rear end portion of the larger diameter portion 4 of the male coupling 1 and the oil pressure chamber 11.

Numerals 18, 19 designate an oil hole and an annular fitting element, respectively, provided at the rear end portion of a concave hole 5 and at the rear end portion of the elastic shell 6.

On the respective side of the device to which the male coupling 1 or the female coupling 3 is fitted, the position and the inclination of the axis are adjusted and the device is assembled as shown in FIG. 13. Upon completing the air evacuation of the hydraulic system of the male coupling 1, in order to obtain a necessary connection force of the couplings, oil pressure is supplied to the oil pressure chamber 11 via the exchange valve 14.

With the oil pressure so supplied, the elastic shell 6 expands mainly in the radial direction and makes close contact with the inner surface of the female coupling 3. As this deflection is made by a stress within the elastic range, if the pressure is restored, the shape of the elastic shell 6 is also restored.

In case the couplings are separated, the exchange valve 14 is switched to "discharge" and the oil in the oil pressure chamber 11 is discharged, the oil pressure drops, the elastic shell 6 shrinks, the close contact with the female coupling 3 is released and the connection force of both couplings is released.

At this moment, the outside air enters the female coupling 3 through the air hole 18 and separation is easily made. The connection between the elastic shell 6 and the male coupling 1 is slidable at one side so that the elastic shell 6 may move in the direction of the X axis in case of expansion of the elastic shell 6.

Figure 14A:
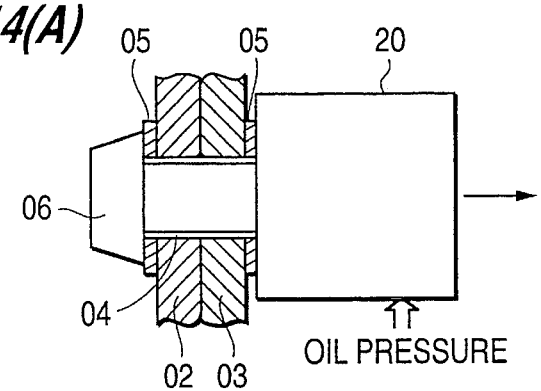
Figure 14B:
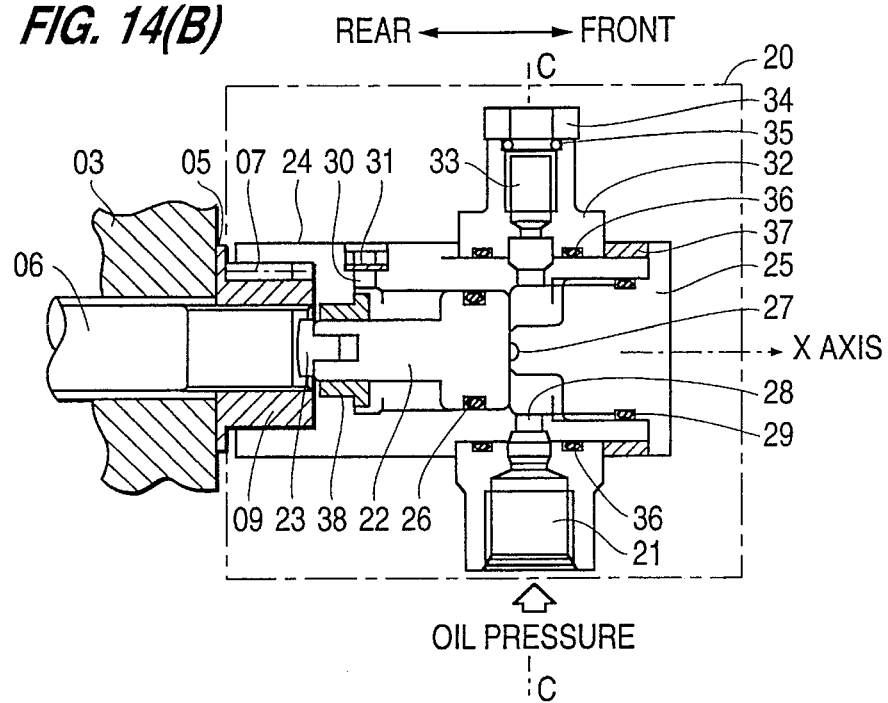
Figure 14C:
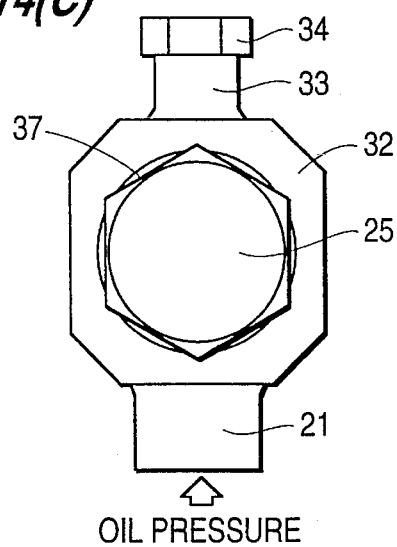

A fifth preferred embodiment according to the present invention is shown in FIG. 14, wherein FIG. 14(A) is a side view, FIG. 14(B) is a partial enlarged longitudinal sectional view and FIG. 14(C) is a front view. Numeral 20 designates a hydraulic separation nut to connect a connected element 02 and a connected element 03 via a bolt 06.

Mainly referring to FIG. 14(B), in the hydraulic separation nut 20, oil is supplied from an oil supply inlet 21 to apply pressure to the front end face of a piston 22 and the piston 22 moves in a rearward direction until the piston head 23 hits a bolt 06. The piston head 23 is made of a material which has enough strength and rigidity against collision with the bolt 06, and is exchangeable in case of deformation, wear, etc.

Upon the piston head hitting the bolt 06, a force along the direction of the X axis (front direction) acts on an actuator body 24 by pressure acting on an end element 25 fixed to the actuator body 24.

A split type nut 09 is incorporated in a box spanner portion at the rear end of the actuator body 24 and is fixed by a pin 07. The split type nut, when it locks the bolt 06, is not slidable in the direction of rotation but is movable along the direction of the X axis relative to the actuator body 24.

Accordingly, if the actuator body 24 is pulled along the direction of the X axis by an end element 25, it is drawn out from the split type nut 09 and the split type nut 09 is released of restraint and scatters from the bolt 06, and as a result the connection of the connected element 02 and the connected element 03 is released.

The piston 22 is sealed by a cap seal 26 which has less sliding resistance, and the end element 25 has a stopper 27 which prevents the piston 22 from closing an oil supply port 28 when the piston 22 moves in the direction of the X axis.

At the apex end portion of the stopper 27, oil grooves etc. are provided so as to make the area of the close contact with the piston 22 smaller, and a seal 29 is provided between the end element 25 and the actuator body 24 to prevent an oil leakage.

In a piston chamber in the actuator body 24, an air hole 30 is provided so that an outflow or an inflow of air due to movement of the actuator body 24 in the rear or front direction may not be obstructed.

Further, in order to prevent a dust intrusion from outside, a filter 31 is provided at the air hole 30.

When the hydraulic separation nut 20 is screwed in the bolt 06, it is necessary to rotate the actuator body 24, and at this time a rotation coupling 32 fitted to the actuator body 24 can hold the angle of the oil pressure supply port 21 constant regardless of rotating movement of the actuator body 24.

This is because of such construction that, even if the actuator body 24 rotates, oil grooves are provided all about the circumference of the actuator body 24 and the rotation coupling 32, and the oil pressure is supplied to the piston 22 regardless of the position of the oil pressure supply port 21, and further the oil supply ports 28 are provided at several places in the grooves of the actuator body 24.

The air which comes into the actuator body 24 is collected in the oil grooves and is taken out from an air escape port 33 by loosening a blind cover 34 which is sealed by a seal 35 so that the oil may not leak out.

Further, the rotation coupling 32 is sealed by a seal 36 and is rotatable about the X axis but is held in a position along the direction of the X axis in relation to the actuator body 24 by the end element 25 via a spacer 37. Also, a stopper 38 guides the piston 22 and restricts the stroke.

As soon as the hydraulic separation nut 20 works and the connection is released, oil supplied to the oil pressure supply port 21 is stopped by the exchange valve, and upon the exchange valve being opened, the oil pressure within the actuator body 24 drops to the atmospheric pressure.

In a state where the piston 22 is pushed so as to make contact to the stopper 27 of the end element 25, the actuator body 24, assembled with the split type nut 09 and the pin 07, is connected to the bolt 06 and becomes ready for separation again.

By adding oil pressure to the oil pressure supply port 21, a chamber at the front end portion of the piston 22 is pressurized, the piston 22 pushes the bolt 06 and at the same time the actuator body 24 receives a force to move in the direction of the X axis by pressure added to the end element 25.

As the main force acting at this moment in the direction of the X axis between the actuator body 24 and the split type nut 09 is a friction force, if a larger force is added thereto, the actuator body 24 moves in the front direction and the split type nut 09 and the pin 07 are drawn out and the connection function of the bolt 06 is released.

In case of repeated uses, the actuator body 24 is assembled with the split type nut 09 and the pin 07 and is used as a hydraulic separation nut 20 again.

In the fifth preferred embodiment, differently from the fourth preferred embodiment, there is an advantage that, the bolt 06 and the split type nut 06 being used, connection structure is simple and a release of connection portions caused by an oil leakage does not occur.

Figure 15:
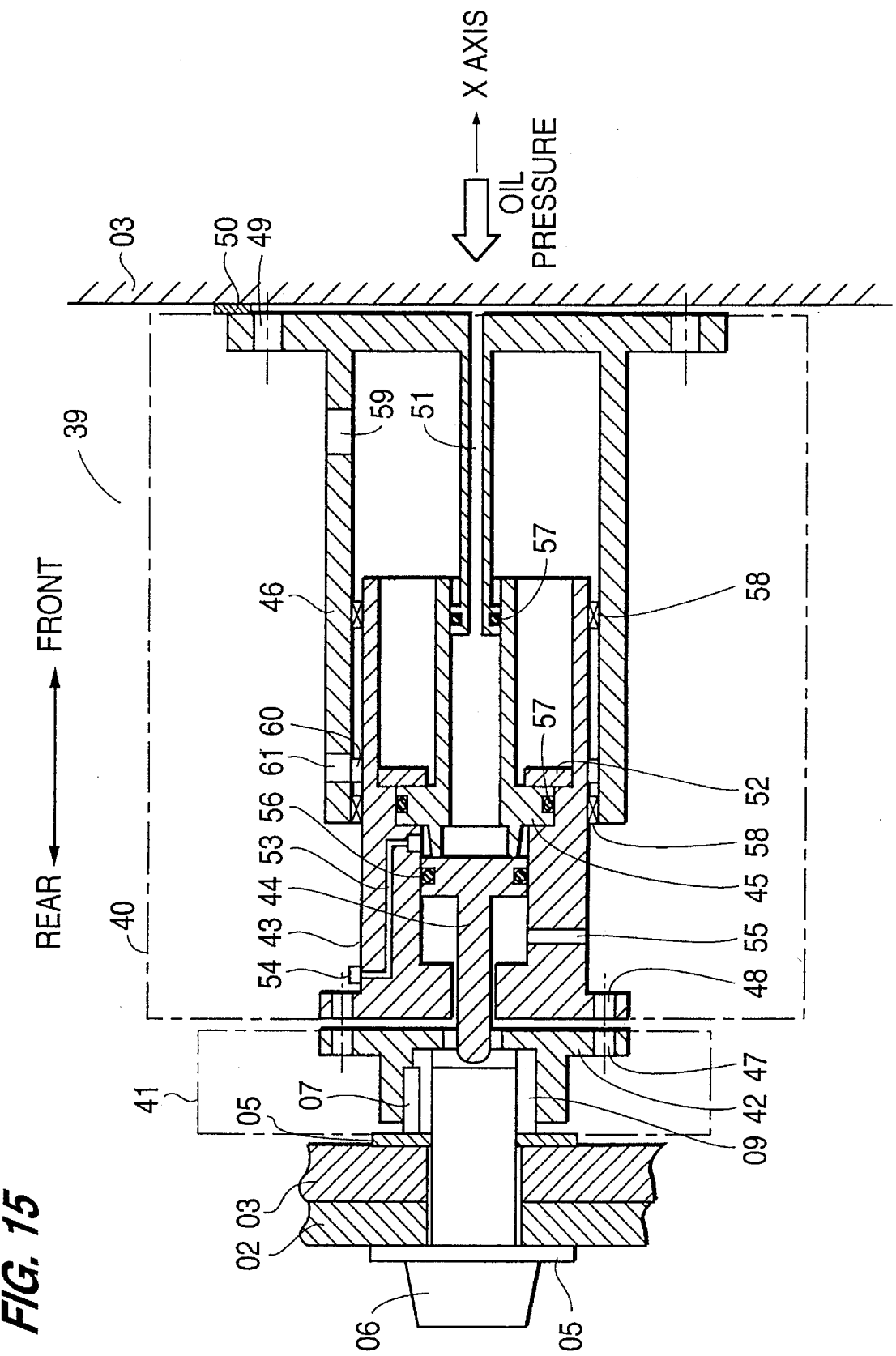
FIG. 15 is a longitudinal sectional view showing a sixth preferred embodiment according to the present invention.

A sixth preferred embodiment according to the present invention is shown in FIG. 15. In the figure, an actuator supporting type hydraulic separation nut 39 is composed of an actuator 40 fixed mainly to a connected element 03 and a separation nut 41 directly connected thereto by a bolt and a nut coaxially.

The separation nut 41 is composed of a split type nut 09, a pin 07 and a nut holding element 42, and the nut holding element 42 is a holding element to make the split type nut 09, which is split into four portions for example, function as a nut. The pin 07 is provided so that, while the separation nut 41 locks a bolt 06, the split type nut 09 and the nut holding element 42 may not slide about the X axis and the nut holding element 42 sides in the direction of the X axis to come out from the split type nut 09.

The actuator 40 is composed of an actuator body 43, a piston 44, an end element 45 and a supporting element 46, and the actuator body 43 is rotatable about the X axis and is movable in the direction of the X axis forwardly and rearwardly.

When the separation nut 41 is drawn out, the supporting element 46 ensures that forces other than the drawing force, or moments, such as weight of the actuator body 43 or forces or moments etc. caused by hydraulic high pressure rubber hoses or pipings, do not act on the separation nut 41. Also, after the drawing is performed, the supporting element 46 supports the actuator body 43 in a retracted state. The supporting element 46 is usable repeatedly by exchanging the separation nut 41.

In a state that the separation nut 41 and the actuator body 43 are connected by use of loose holes 47, 48, a connected element 02 and a connected element 03 are connected by use of a bolt 06 and washers 05.

At this time, the fixed portion of the supporting element 46 is loosened so as to be movable within the range of loose holes 49, and if an interstice occurs at the fixed portion of the supporting element 46, an adjustment is made by use of a shim 50.

If as a fixing method of the supporting element 46, a trunnion bearing using a self-aligning type bearing is employed, it is less of a possibility that a shim 50 may be used for adjustment of an inclined connection face.

Upon oil pressure being supplied through an oil supply passage 51 of the supporting element 46, a chamber at the front end portion of the piston 44 is pressurized, the piston 44 touches the bolt 06 and stops, and an end element 45 moves in the reverse direction along the X axis.

Then, as the end element 45 is firmly fixed to the actuator body 43 by a stopper 52, the actuator body 43 moves along the direction of the X axis, the nut holding element 42 of the separation nut 41 is drawn out, the split type nut 41 scatters to lose its locking function, and as a result the connection of element 02 and element 03 is released.

The end element 45 has a slidable oil passage so as to enable it to be supplied with oil even during a movement of the actuator body 43 in the direction of the X axis or in a rotation about the X axis.

At the actuator body 43, an air escape passage 53 and a blind cover 54 are provided for evacuating accumulated air, and an air hole 55 is provided by which the air within the actuator body 43 can come in and come out corresponding to the movement of the piston 44.

As for seals for the hydraulic system, a cap seal 56 is provided for the sliding portion and seals 57 are provided for fixed portions.

The supporting element 46 supports the actuator body 43 by a bearing 58, for example, of an oil impregnated bearing etc. so that the actuator body 43 may have a sliding and rotating function in the direction of and about the X axis.

For inflow or outflow of the air within the supporting element 46, an air hole 50 is provided. A stopper fitting hole 61 is provided for fitting a stopper 60 so that the actuator body 43 may not draw out and drop from the supporting element 46. In this preferred embodiment, the supporting element 46 is of a bolt connecting type and has loose holes 49 for fitting.

By supplying oil pressure through an oil supply passage 51 of the supporting element 46, the piston 44 moves to the rear direction in FIG. 15 and upon touching the bolt 06 the movement stops and the end element 45 moves in the reverse direction along the direction of the X axis.

Then, as the end element 45 is fixed to the actuator body 43, the actuator body 43 moves in the front direction and draws out the nut holding element 42 from the split type nut 09, thus the split type nut 09 no longer functions as a nut and scatters and the connection of the connected element 02 and the connected element 03 is released.

The actuator body 43 is supported by the supporting element 46, and forces caused by the weight of the actuator body 43 or the weight of the high pressure hydraulic hoses or the high pressure thereof, etc. do not act on the actuator body 43.

After the nut holding element 42 is drawn out, the actuator body 43 is held in a retracted state within the supporting element 46, and by fitting a new separation nut 41 to the actuator body 43, repeated use becomes possible.

In the sixth preferred embodiment, differently from the, fifth preferred embodiment, the following advantages as a nut holding element 42, a supporting element 46, etc. are provided:

(1) When the actuator body 43 moves along the direction of the X axis, there is less force to prevent the movement, sectional area of the piston 44 can be smaller, and as a result, oil quantity can be less, and thus faster separation can be made.

(2) Replacement of the split type nut 09 can be made as a unit of the separation nut 41, and as a result, the work is carried out efficiently and the economy in the repeated uses can be enhanced.

(3) The actuator body 43 is stably supported by supporting element 46, and as a result, the drawing out or removal of the nut holding element 42 from the split type nut 09 is ensured and reliability can be further enhanced.

By the present invention being so constructed as described above, the following effects can be obtained:

(1) By use of a hydraulic separation coupling, an oil pressure source and a nut separation control device, an actuation of a colliding G including such high frequency waves as have heretofore not been feasible becomes possible, which enables more practical colliding G simulations, and evaluation etc. of safety devices against collision can be made with improved accuracy.

(2) While there is almost no portion which can be used repeatedly in the powder type or electrical type separation nut methods of the prior art, repeated use can be made only with the separation nut needing to be replaced in the present invention, which is economical over long term use.

(3) By a separation coupling using a piston connection type hydraulic separation nut, the weight of the moving portions, which imparts an important influence on the responsiveness is reduced considerably and a highly responsive separation coupling can be realized.

(4) As the actuator body can be directly fixed, a supporting element etc. becomes unnecessary and the device can be made more compact.

(5) As the sliding portions are minimized, manufacturing becomes simpler.

(6) By use of an inertia force type separation nut, even if a separation by an instruction signal of a separation coupling is delayed, the inertia force type actuator works upon a velocity reduction acceleration in the velocity reduction stroke of a vibration generator, which helps the actuator to work, and before the piston comes to the stroke end, the separation coupling is separated, thus the time in which the vibration portion, the separation coupling and the vibrated portion are exposed to a quick velocity reduction acceleration environment can be shortened. Thereby, breakage of each component part can be prevented.

(7) If the separation coupling does not make separation by the actuator and completes the velocity reduction within the velocity reduction stroke of the vibration generator while it is connected to the connected portions or if the velocity reduction is not fully made and collision with the stroke end of the vibration generator occurs, the inertia force type actuator works in the velocity reduction stroke and a separation is made before the piston collides with the stroke end of the vibration generator. Thereby, breakage of each component part can be prevented.

(8) As the coupling is separated at a high velocity by discharging oil pressure within the closed chamber formed with the elastic shell inbetween, or as the coupling is separated at a high velocity by supplying oil pressure into the chamber of the front end portion of the piston provided within the actuator body and taking off the connection function of the split type nut by moving the piston and the actuator body in the opposite directions in turn, or as the coupling is separated likewise as mentioned above by the actuator body provided with a nut holding element, regulations and controls, etc. are not applicable, repeated use is possible and there is no scattering of component parts, and accordingly a hydraulic high velocity separation device of a fit-in type coupling which is excellent in practicality, economy, safety, preserveability, etc. can be obtained, which is extremely useful in the industry.

While a principle of the present invention has been described above, it is intended that all matter contained in the above description and illustrated in the accompanying drawings shall be interpreted to be illustrative and not as a limitation to the scope of the invention.

What is claimed is:

1. A colliding G simulation apparatus comprising:

a hydraulic actuator connected to a hydraulic pressure source;

a mock vehicle connected to a hydraulic pressure source;

a hydraulic separation coupling device connecting said hydraulic actuator and said mock vehicle, and separating said hydraulic actuator and said mock vehicle in response to a separation control signal; and a hydraulic circuit for generating a target acceleration at said hydraulic actuator based on an acceleration control signal when said hydraulic actuator and said mock vehicle are connected by said hydraulic separation coupling device.

2. The colliding G simulation apparatus as claimed in claim 1, wherein said hydraulic separation coupling device comprises:

a hydraulic actuator side coupling;

a mock vehicle side coupling;

a bolt having an axis and being inserted through said hydraulic actuator side coupling and said mock vehicle side coupling;

a nut holding element having an apex concave portion and being slidable along the axis of said bolt;

a split type nut;

a rotation preventing pin, wherein said split type nut and said rotation preventing pin are inserted in said apex concave portion of said nut holding element and engage said bolt to connect said hydraulic actuator side coupling and said mock vehicle side coupling;

an actuator body fixed to said mock vehicle side coupling;

a piston slidably positioned within said actuator body and slidable along the axis of said bolt;

a connecting element connecting said nut holding element and said piston, wherein said connecting element and said piston define a chamber at a front end of said piston; and a hydraulic pressure supply passage communicating with said chamber.

3. The colliding G simulation apparatus as claimed in claim 1, wherein said hydraulic separation coupling device comprises:

a hydraulic actuator side coupling;

a mock vehicle side coupling;

a bolt having an axis and being inserted through said hydraulic actuator side coupling and said mock vehicle side coupling;

a nut holding element having an apex concave portion, said nut holding element being slidable along the axis of said bolt;

a split type nut;

a rotation preventing pin, wherein said split type nut and said rotation preventing pin are inserted in said apex concave portion of said nut holding element and engage said bolt to connect said hydraulic actuator side coupling and said mock vehicle side coupling;

an actuator body having an output shaft and being fixed to said mock vehicle side coupling; and an inertia force type actuator provided between said nut holding element and said actuator body, said inertia force type actuator including:

a cylindrical holding element having a through hole and being fixed to said mock vehicle side coupling;

a weight element provided within said cylindrical holding element and connected to said nut holding element, said weight element being slidable along the axis of said bolt and having a groove in an outer peripheral surface of said weight, wherein said groove is formed with an angled face which is inclined toward said bolt;

a connecting element connecting said nut holding element and said output shaft of said actuator body; and a stopper element inserted into said groove and having a curved face engaging said inclined face portion of said groove.

4. The colliding G simulation apparatus as claimed in claim 1, wherein said hydraulic separation coupling device comprises:

a hydraulic actuator side coupling;

a mock vehicle side coupling, wherein one of said couplings is an inner coupling which is fittable within the other of said couplings so as to form an annular space between said couplings;

an elastic shell provided in said annular space, and defining a closed space between itself and an outer peripheral surface of said inner coupling;

a first opening formed in said inner coupling, said first opening communicating with said closed space;

a second opening formed in said inner coupling;

a fluid passage extending between said first opening and said second opening; and an exchange valve fixed to said second opening to alternately permit flow of fluid into said passage and out of said passage.

5. The colliding G simulation apparatus as claimed in claim 1, wherein said hydraulic separation coupling device comprises:

a hydraulic actuator side coupling;

a mock vehicle side coupling;

a bolt inserted though said hydraulic actuator side coupling and said mock vehicle side coupling;

an actuator body having an apex concave position;

a split type nut;

a rotation preventing pin, wherein said split type nut and said rotation preventing pin are inserted in said apex concave portion of said actuator body, and said nut is received on said bolt to connect said couplings;

a piston slidably mounted within said actuator body and slidable along the axis of said bolt, wherein said actuator body and said piston define a chamber at a front side of said piston; and a hydraulic pressure supply passage communicating with said chamber.

6. The colliding G simulation apparatus as claimed in claim 1, wherein said hydraulic separation coupling device comprises:

a hydraulic actuator side coupling;

a mock vehicle side coupling;

a bolt inserted though said hydraulic actuator side coupling and said mock vehicle side coupling;

a nut holding element having an apex concave portion, said nut holding element being slidable along the axis of said bolt;

a split type nut;

a rotation preventing pin, wherein said split type nut and said rotation preventing pin are inserted in said apex concave portion of said nut holding element, and said split type nut is received on said bolt to connect said couplings;

a supporting element fixed to said mock vehicle side coupling;

an actuator body connected to said nut holding element and engaged with said supporting element, and said actuator body being slidable along the axis of said bolt, wherein said sliding movement of said actuator body is guided by said supporting element;

a piston provided within said actuator body and being slidable along the axis of said bolt, wherein said actuator body and said piston define a chamber at a front side of said piston; and a hydraulic pressure supply passage communicating with said chamber.

* * * * *